United States Patent [19]

Kempter et al.

[11] 4,137,213

[45] Jan. 30, 1979

[54] PIGMENT FORMULATIONS FOR USE IN SURFACE-COATING BINDERS

[75] Inventors: Fritz E. Kempter, Mannheim; Erich Gulbins, Heidelberg-Neuenheim; Armin Haag, Gross-Sachsen; Ruprecht Kroker, Ludwigshafen, all of Fed. Rep. of Germany

[73] Assignee: BASF Aktiengesellschaft, Ludwigshafen, Fed. Rep. of Germany

[21] Appl. No.: 764,196

[22] Filed: Jan. 31, 1977

[30] Foreign Application Priority Data

Feb. 20, 1976 [DE] Fed. Rep. of Germany ....... 2606831

[51] Int. Cl.² .............................................. C08K 9/04
[52] U.S. Cl. ................................... 260/39 P; 260/834; 528/98; 528/111
[58] Field of Search ................... 260/39 R, 39 P, 834, 260/67.6 R

[56] References Cited

U.S. PATENT DOCUMENTS

| 2,824,850 | 2/1958 | Widmer et al. ....................... 260/834 |
| 2,915,502 | 12/1959 | Albrecht ........................... 260/2 EP |
| 3,145,207 | 8/1964 | Wohnseidler ....................... 260/834 |
| 3,456,035 | 7/1969 | Enders et al. ....................... 260/834 |
| 3,651,169 | 3/1972 | Davis, Jr. ............................. 260/834 |

Primary Examiner—Sandra M. Person
Attorney, Agent, or Firm—Keil, Thompson & Shurtleff

[57] ABSTRACT

Pigment formulations and their use.

The formulations contain pigments, organic solvents and from 10 to 80% by weight of a wetting agent consisting of a non-ionic organic compound which has a viscosity of from 500 to 10,000 mPa.s and has been produced by reacting an alkylated amide/formaldehyde reaction product and an epoxy resin, which may or may not be modified, in a weight ratio of from 9:1 to 1:9. They are used as additives in surface-coating binders, especially in cationic electrocoating finishes.

7 Claims, No Drawings

PIGMENT FORMULATIONS FOR USE IN SURFACE-COATING BINDERS

The present invention relates to pigment formulations containing non-ionic wetting agents, and to their use as additives in surface coating binders, especially in cationic electrocoating finishes.

Conventionally, pigments and fillers are incorporated into surface-coating binders by directly grinding the additives with the binder. In many cases, this gives a sufficiently homogeneous product; however, frequently the compatibility is inadequate, resulting in sedimentation of the pigment in the finish. Electrocoating finishes, in particular, exhibit pigment dewetting phenomena, causing the coated articles to have a non-uniform surface structure, especially on vertical surfaces.

In the case of electrocoating finishes, organic solvents are often added for this reason when grinding the pigments with the binder, and this improves the compatibility. However, since the binders in general themselves contain solvents and the presence of substantial amounts of organic liquids, when carrying out the electrocoating, interferes with the deposition of the finish, by lowering the electric strength, there are limits to the use of this approach, above all in the case of cationic electrocoating finishes. Attempts have been made to overcome these difficulties by using ionic wetting agents. This however greatly reduces the corrosion protection provided by the finish.

It is an object of the present invention to provide pigment formulations for surface-coating binders which contain a non-ionic wetting agent. This wetting agent is intended to ensure compatibility between the pigment or filler and the binder, without adversely affecting the properties of the finish.

We have found that this object is achieved by the pigment formulations according to the invention, which contain pigments, organic solvents and from 10 to 80% by weight of a wetting agent. The wetting agent is a non-ionic organic compound having a viscosity of from 500 to 10,000 mPa.s, as measured on an 80% strength solution in i-propanol in a Hoppler viscometer at 20° C., using ball No. 5, and is manufactured by reacting (A) an alkylated amide/formaldehyde condensation product and (B) an epoxy resin, which may or may not be modified.

The wetting agent is a preferably liquid trans-etherification product of an alkylated amine/formaldehyde condensation product A and an epoxy resin B, which resin may or may not be modified.

Any etherified amide/formaldehyde condensation product may be employed as component A; examples are condensation products of melamine, urea, benzoguanamine or, preferably, acetylenediurea with formaldehyde. The condensation products are employed in an alkylated form, but the etherificaton need not necessarily be complete. In practice, a degree of etherificaton of from 70 to 100% suffices. Suitable alcohols for the etherification are alkanols of 1 to 8 carbon atoms, preferably methanol, n-butanol and iso-butanol. The preferred component A is a tetraalkyl ether of tetramethylolacetylenediurea such as those described, for example, in German Pat. No. 859,019.

The component B can be any epoxy resin; for example, it may comprise di-, tri- or tetra-glycidyl ethers of pentaerythritol, glycerol, trimethylolpropane or other polyhydric aliphatic alcohols or diglycidyl ethers of bisphenol A or other polynuclear polyhydric phenols. Glycidyl ethers of pentaerythritol are preferred. For use in cationic electrocoating finishes it is advantageous if the wetting agents are substantially free from epoxide groups. The preferred components B are therefore modified epoxy resins, in which the epoxide groups have been entirely or substantially removed by adduct formation. For the latter purpose, phenols and bisphenols, but also mercaptans or dimercaptans, may be used. The modification may be taken to the point where more than 80%, and preferably more than 90%, of the epoxide groups originally present in the epoxy resin have been removed by reaction.

To produce the wetting agents, the components A and B are reacted with one another; for this, they are employed in a weight ratio of from 9:1 to 1:9, preferably from 7:3 to 3:7. The reaction is in general carried out at from 80 to 120° C., preferably in the presence of acid catalysts, eg. p-toluenesulfonic acid. The reaction causes a trans-etherification, in which the hydroxyl groups of the epoxy resin displace the alkanols from the ether groups of the amide/formaldehyde condensation product. The degree of trans-etherification is not particularly critical and may be from 10 to 100%.

The wetting agent is an organic compound which is liquid at room temperature and has a viscosity of from 500 to 10,000, preferably from 1,000 to 5,000, mPa.s (at a solids content of from 90 to 97%). Its molecular weight is preferably from 500 to 2,000.

The pigment formulations of the invention contain from 10 to 80, preferably from 20 to 50, % by weight of the wetting agent. In addition, they contain from about 10 to 50, preferably from 20 to 40, % by weight of organic solvents, for example alcohols or ethers, eg. n- and iso-propanol, n- and iso-butanol or butylglycol or their mixtures. They may also contain further binders, and these may be virtually any conventional surface-coating binders, eg. polyester, acrylate, epoxy or polyurethane resins. It should be mentioned at this juncture that the wetting agents are in general also deposited on the substrates when these are being coated, and then act as binders, in the finish, for the pigments and other additives present. Of course, the pigment formulations contain inorganic or organic pigments, eg. metal oxides, sulfates, sulfides or chromates. Titanium dioxide and carbon black are preferred as white and grey pigments respectively. For the purposes of the invention, pigments also include the inorganic fillers, for example metal silicates, eg. talc.

To produce the pigment formulations, the starting materials are mixed with one another in conventional mixing equipment, eg. ball mills or triple roll mills.

The pigment formulations of the invention may be used as additives in surface-coating binders, especially for electrocoating finishes. Electrocoating finishes are aqueous dispersions which have a solids content of from about 5 to 20% by weight and contain polymeric organic binders which carry molecular groups possessing electrical charges.

The wetting agents bring about, or increase, the compatibility of these binders with the pigments. The content of wetting agent in the finish is preferably from 5 to 20% by weight, based on the binders. The pigment formulations of the invention may be used with particular advantage in cationic electrocoating finishes in which the binders carry cationic groups, preferably ammonium groups or sulfonium groups. Such binders are described, for example, in German Laid-Open applications DOS Nos. 1,546,840, 1,546,848, 1,814,072, 1,930,949, 2,033,770, 2,057,799, 2,163,143, 2,261,804, 2,236,910, 2,252,536 and 2,363,074 and in particular in German Laid-Open applications DOS No. 2,320,301 (corresponding to U.S. application Ser. No. 461,503), 2,357,075 (corresponding to U.S. application Ser. No. 522,629 or U.S. Pat. No. 3,994,989) and 2,554,080. The binders, in a protonized form, which are described in these publications are reaction products of Mannich bases, produced from polyhydric polynuclear phenols, secondary alkanolamines and formaldehyde, with epoxy resins. They carry ammonium and hydroxyl groups, as well as isocyanate groups which may or may not be blocked.

In the Examples, parts and percentages are by weight.

EXAMPLE (a) Manufacture of the wetting agent:

1,485 parts of a glycidyl ether or pentaerythritol (epoxide value about 0.57) are reacted with 573.6 parts of phenol in the course of 2 hours at 180° C. The epoxide value drops to about 0.08. The resulting modified epoxy resin B is mixed in various ratios with the tetrabutyl ether of tetramethylolacetylenediurea (component A), 0.1% (based on solids) of p-toluenesulfonic acid is added in each case, and the mixture is heated at 100° C. The results are shown in Table 1.

TABLE 1

| Experiment | Ratio A:B | Reaction time hours | Molecular weight | Viscosity mPa . s |
|---|---|---|---|---|
| I | 8:2 | 2 | ~800 | ~600 |
| II | 6:4 | 3 | ~740 | ~800 |
| III | 4:6 | 3 | ~1,1800 | ~1,000 |

(b) Manufacture of a pigment paste:

428 parts of wetting agent II, 400 parts of talc, 85 parts of butylglycol and 210 parts of iso-butanol are mixed in a high-speed stirrer and 86 parts of carbon black are then added; the mixture is ground three times on a triple roll mill.

(c) 150 parts of the pigment paste are mixed with 856 parts of the cationic binder described in Example 3 of U.S. Pat. No. 3,994,989 and 12 parts of glacial acetic acid. The mixture is then diluted to 6 liters with fully desalinated water. To remove the solvent, the bath is stirred for 3 days at 30° C.

(d) Electrocoating:

An L-shaped phosphatized piece of sheet iron is electrocoated with the above finish for 2 minutes at 280 volts and 30° C. After curing (190° C./20 minutes), both the vertical and the horizontal faces exhibit a perfect surface.

We claim:

1. A pigment formulation which contains pigments, organic solvents and from 10 to 80% by weight of a wetting agent, wherein the wetting agent is a non-ionic organic compound which has a viscosity of from 500 to 10,000 mPa.s and has been produced by reacting
   (A) an alkylated amide/formaldehyde condensation product with
   (B) a modified epoxy resin which is an adduct of an epoxy resin and one or more compounds selected from the group consisting of phenol, bisphenol, mercaptan and dimercaptan, at least 80% of the epoxide groups of the epoxy resin having undergone adduct formation, the weight ratio of (A) to (B) being from 9:1 to 1:9 and the reaction of (A) with (B) being carried out at from 80 to 120° C. in the presence of an acid catalyst.

2. A pigment formulation as set forth in claim 1, wherein the component (A) is a condensation product of formaldehyde and a compound from the group comprising melamine, urea, benzoguanamide and acetylenediurea, and has been at least partially etherified with an alkanol of 1 to 8 carbon atoms.

3. A pigment formulation as set forth in claim 1, wherein the wetting agent has been obtained by substitution of the hydroxyl groups of (B) for the alkanols from the ether groups of (A) to a degree of from 10 to 100% by transetherification.

4. A surface-coating binder to which has been added a pigment formulation as set forth in claim 1, the content of wetting agent being from 5 to 20% by weight, based on the binder.

5. A surface-coating binder as set forth in claim 4, said binder being a reaction product of Mannich bases, produced from polyhydric polynuclear phenols, secondary alkanolamines and formaldehyde, with epoxy resins, and said binder being in a protonized form.

6. A cationic electrocoating finish containing a surface-coating binder as set forth in claim 4.

7. A cationic electrocoating finish containing a surface-coating binder as set forth in claim 5.

* * * * *